United States Patent [19]

Rimmer

[11] Patent Number: 4,953,142
[45] Date of Patent: Aug. 28, 1990

[54] MODEL-BASED DEPTH PROCESSING OF SEISMIC DATA

[75] Inventor: Daniel H. Rimmer, Littleton, Colo.
[73] Assignee: Marathon Oil Company, Findlay, Ohio
[21] Appl. No.: 294,536
[22] Filed: Jan. 6, 1989
[51] Int. Cl.$^5$ ............................................. G01V 1/28
[52] U.S. Cl. ......................................... 367/73; 367/53
[58] Field of Search ...................... 367/73, 53, 72, 38; 364/421

[56] References Cited

U.S. PATENT DOCUMENTS

| | | | |
|---|---|---|---|
| 4,223,399 | 9/1980 | Hackett | 367/41 |
| 4,259,733 | 3/1981 | Taner et al. | 367/61 |
| 4,415,999 | 11/1983 | Moeckel et al. | 367/73 |
| 4,592,032 | 5/1986 | Ruckgaber | 367/73 |
| 4,630,242 | 12/1986 | Done | 367/73 |
| 4,679,174 | 7/1987 | Gelfand | 367/73 |
| 4,736,347 | 4/1988 | Goldberg et al. | 367/46 |
| 4,742,497 | 5/1988 | Beasley et al. | 367/52 |
| 4,760,563 | 7/1988 | Beylkin | 367/73 |
| 4,766,574 | 8/1988 | Whitmore, Jr. et al. | 367/50 |

OTHER PUBLICATIONS

"Trends in Seismic Data Processing," French, W. S., Geophysics, The Leading Edge of Exploration, Sep. 1986, pp. 38–45 & 110.
"Seismic Lithologic Modeling;" Western Geophysical Brochure, 1983.

Primary Examiner—Ian J. Lobo
Attorney, Agent, or Firm—Jack L. Hummel; Jack E. Ebel

[57] ABSTRACT

A model-based iterative method of depth-processing seismic data. An estimate of a geologic horizon is entered into a three-dimensional seismic model and synthetic shot records are determined from the model. Reflection tracks are estimated from the modeling results. The actual seismic traces are sorted into bins according to common reflection points determined from the reflection tracks and are stacked. The sorted and stacked data are used to estimate the difference between the seismic travel time and the model travel time, and the model is changed in order to match the seismic data. The process is repeated until the margin of error is acceptable. Lower horizons of interest are modeled in the same way until all the horizons of interest in a geological area are determined.

7 Claims, 5 Drawing Sheets

MODEL-BASED DEPTH PROCESSING OF SEISMIC DATA

FIELD OF THE INVENTION

This invention relates to the processing of seismic data to determine the geological structure of the subsurface of the earth. More particularly, it relates to a method of depth processing seismic data to enhance structural information in areas of steep dip.

BACKGROUND OF THE INVENTION

The processing and interpretation of seismic data to define the earth's subsurface has long been used in locating oil and gas reserves and determining optimum locations for drilling. Seismic data is accumulated by well known methods. Typically, seismic receivers or geophones are laid out along a seismic line at spaced intervals from a shotpoint which sends a wave of seismic energy into the earth. The energy generated by the source penetrates the layers of material in the subsurface of the area of interest, propagating at different speeds through different types of formations. As a result of reflections, refractions and diffractions occurring at each layer of material encountered, secondary seismic energy is returned to the surface. The secondary energy signals are detected by the geophones which generate electrical signals representative of the amplitude of the secondary seismic energy. The sensor array is then moved along the line to a new position and the process is repeated, ultimately resulting in data from a large number of closely spaced geophone locations. The same basic approach is utilized in offshore exploration as well as on land.

The signals generated by the geophones are processed in the field or at a later time in a data processing center to remove noise and extraneous signals so that only reflected signals remain, and the amplitude of the signals from each geophone is continuously recorded against time to produce seismograms. In order to eventually create a depth profile of the various layers or horizons of interest the reflected ray traces between the shotpoint and each geophone must be grouped and compared. The conventional way of doing this is to assume that a point halfway between the shotpoint and a receiver overlies the point on the subsurface layer of interest from which the reflection came. This point is known as the common mid point (CMP) or the common depth point (CDP). Traces are binned according to the CDP and are summed or stacked for purposes of data interpretation. According to the CDP theory it is assumed that the time it takes for the primary energy from the shotpoint to reach the horizon is equal to the time for the reflected energy to reach the receiver. Thus by determining the distance traveled by the energy wave in half the time between the instant of the shot and the signals generated by a receiver, the depth of the horizon of interest can be determined.

This underlying theory is known to be incorrect in all but those cases in which the horizon is horizontal. If the horizon dips the reflection point on the horizon will not be directly beneath the CDP but will be offset from it, which means that the time for the primary energy wave to reach the reflection point is greater or less than the time for the secondary energy to reach the receiver. To compensate for these intrinsic errors corrections to the data are performed. Thus normal moveout corrections, which convert each receiver output to the output it would have produced if the source and receiver had been located at the CDP, and dip moveout corrections, which account for the slope of the relevant horizon, are carried out. These corrections, which involve the shifting in time of the reflected events of the traces, are still not able, however, to overcome the basic errors inherent in the CDP theory in areas of steep dip. Such errors can produce final mapping errors of considerable significance, the magnitude of which can readily be greater than a mile or more.

In areas of steep dip, such as in the vicinity of salt domes where both the dip and the dip direction of seismic reflectors change rapidly over a short distance, it is desirable to use depth processing in order to provide a three-dimensional image of the substructure. This requires that the area of the reflected energy be located in all three spatial dimensions. One way of accomplishing this is to lay out the seismic lines along grids and then shoot and process the data, using three-dimensional time migration. There are problems, however, in utilizing this method. In practice, the location of the source and receivers must be accurately known. Otherwise, the quality of the resulting seismic images can be seriously degraded. Further, errors in location can readily result from surveying errors, processing errors, bookkeeping errors, and communication errors between the shooter and the observer as to the source being initiated. In addition, even when the program is run correctly, it requires a great deal of time compared to a simpler two-dimensional program run along one or several seismic lines.

Another way of locating the reflected energy in all three spatial directions is to use data from two-dimensional seismic lines and apply time migration corrections. This still does not take into account energy recorded from reflections originating out of the vertical plane of the seismic line, as would be encountered in an area of steep dips. Moreover, the data is still initially inexact due to the inherent drawbacks of the CDP theory discussed above.

In both systems of producing three-dimensional models the practical limitation of the slope of dips which can be imaged is up to about 60°. Since areas of steeper dips are not uncommon, particularly in the vicinity of salt domes, it would be highly desirable to be able to image steeper dips. Due to the errors introduced by CDP stacks or gathers it would be desirable to be able to produce three-dimensional models which are not based on the CDP traces.

SUMMARY OF THE INVENTION

The invention broadly involves an iterative process involving the use of a seismic model to create synthetic traces binned according to their common reflection points rather than their common midpoints, and then changing the model after comparing the model data with the seismic data. This is done for each seismic line and is continued for a horizon of interest until the margin of error between the model and the seismic data is acceptable. Because of the effects of shallower horizons on deeper reflections, each major horizon in the model must be built from the top down.

The subsurface reflection points of the synthetic model traces may be determined by computing three-dimensional synthetic shot records for the seismic lines being processed and estimating reflection tracks for the seismic lines. The common reflection points of the computed seismic shot traces are then determined and used to bin the actual seismic traces. After suitable time-to-depth corrections, the actual seismic traces are stacked and the actual seismic event is compared with the predicted model event so as to estimate the difference between the seismic travel time and the model travel time and the error in interval velocity. The model is then corrected according to this information.

As a result of using common reflection points in determining the traces instead of common midpoints a much more accurate representation of steep dips is now possible. Whereas energy from out of the plane of the seismic line previously caused inaccurate imaging of dipping horizons when traces were created by the common midpoint method, dips as steep as 80° can be seen. Accurate portrayals of steep dips, such as in the area of salt dome formations, can be quite significant in the field of oil and gas prospecting, even to the extent of enabling a better determination for the location of the drill bit. In addition, the composition of the rock encountered can now be better identified due to the more accurate amplitudes of the data. Thus the more consistent reflection response results in improved lithology.

Other features and aspects of the invention, as well as other benefits thereof, will readily be ascertained from the more detailed description of the invention which follows.

DESCRIPTION OF THE PREFERRED EMBODIMENT

Figure 1:
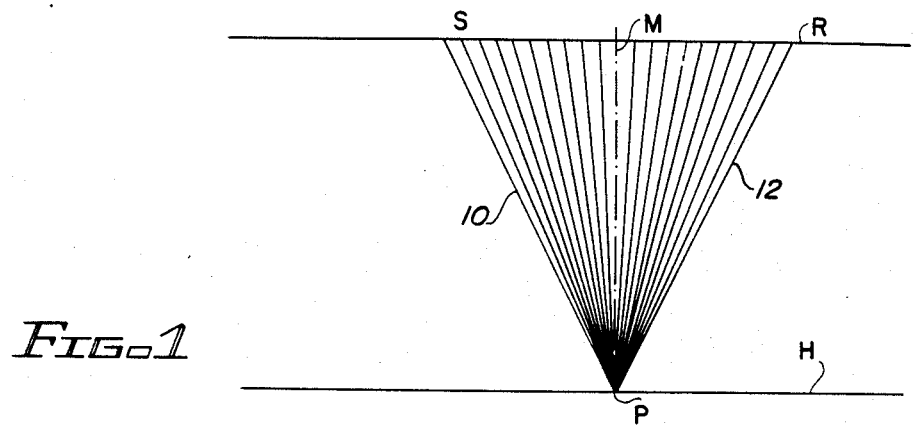
FIG. 1 is a schematic representation of a common midpoint or common depth point gather for a horizontal horizon.

Referring to FIG. 1, as background to the understanding of the invention it will be seen that the wavefront of acoustic energy emitted from source S is schematically shown as a ray following the primary path 10 to the point P on the horizontal horizon H. The path of the energy reflected from the horizon H up to the receiver R is indicated at 12. The point P is the common reflection point (CRP) for the various traces depicted. The midpoint M between the source S and the receiver R, which as previously pointed out is known as the common midpoint (CMP) or the common depth point (CDP), can be seen to directly overlie the common reflection point P. Thus the common depth point in the case of a horizontal horizon is identical to the common reflection point, so that in this case the assumption in the CDP method that there is normal incidence from the point P to the midpoint M is correct.

Figure 2:
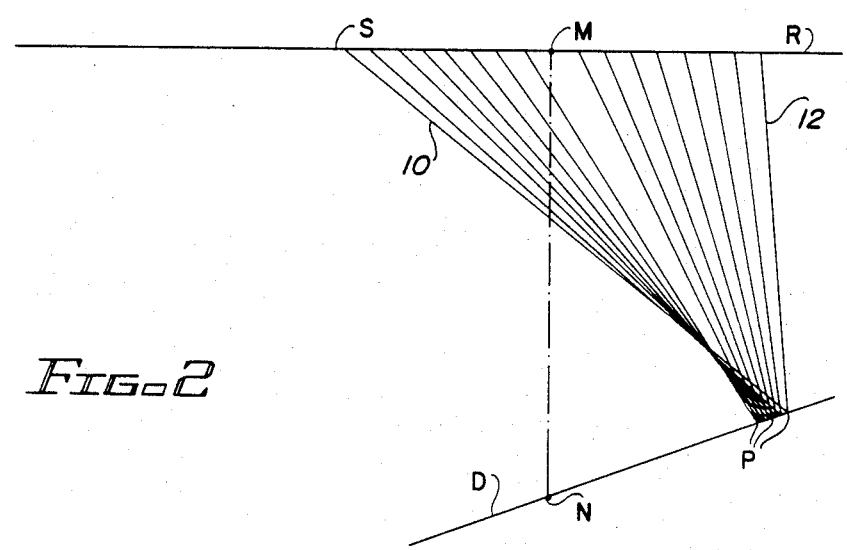
FIG. 2 is a schematic representation of a common midpoint or common depth point gather for a sloping horizon.

This is not true, however, for a sloping horizon. As shown in FIG. 2, rays from a source S are reflected from the sloping horizon or dip D at a series of points P instead of at a single common point, this point spread sometimes being referred to as CDP smear. In this case a line normal to the midpoint M between the acoustic source S and the receiver R intersects the horizon D at a point N considerably spaced from the reflection points P. It will be appreciated that if the slope of the horizon is low the reflection points P will be both relatively closely spaced to each other and relatively close to the intersection point N. Thus even though the rays would not accurately fit the CDP theory, the disparity may be small enough so as not to seriously affect the accuracy of a CDP stack section. If the slope of the horizon is steep the reflection points P will be quite remote from the intersection point N and more widely separated from each other, and a CDP section could be quite inaccurate.

Figure 3:
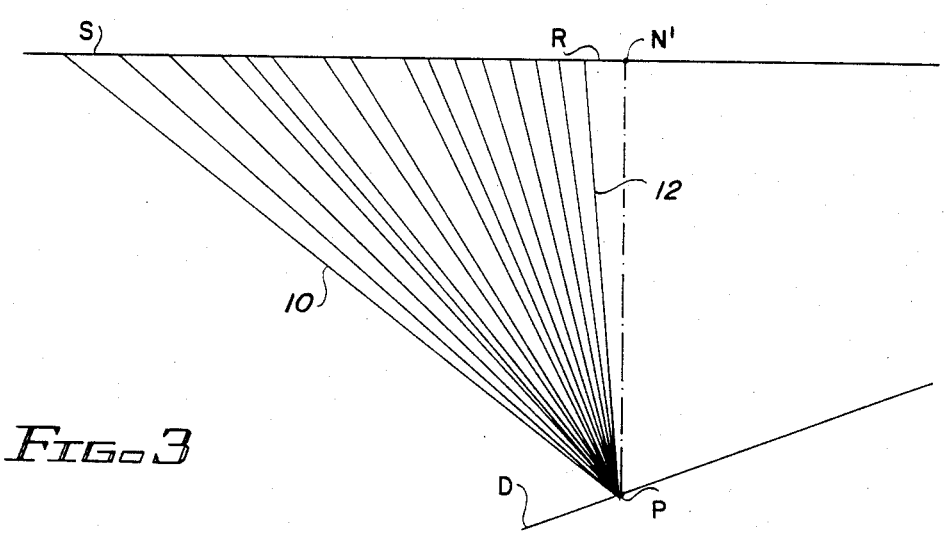
FIG. 3 is a schematic representation of a common reflection point gather for a sloping horizon.

Referring to FIG. 3, the rays 10 are reflected from a common reflection point P on a dipping layer D. Even though the horizon is so steep that both the source S and the receiver R are located on the same side of a point N' directly overlying the point P, the energy received by the receivers R is reflected from the same point, thus eliminating the erroneous effects of CDP smear.

Figure 4:
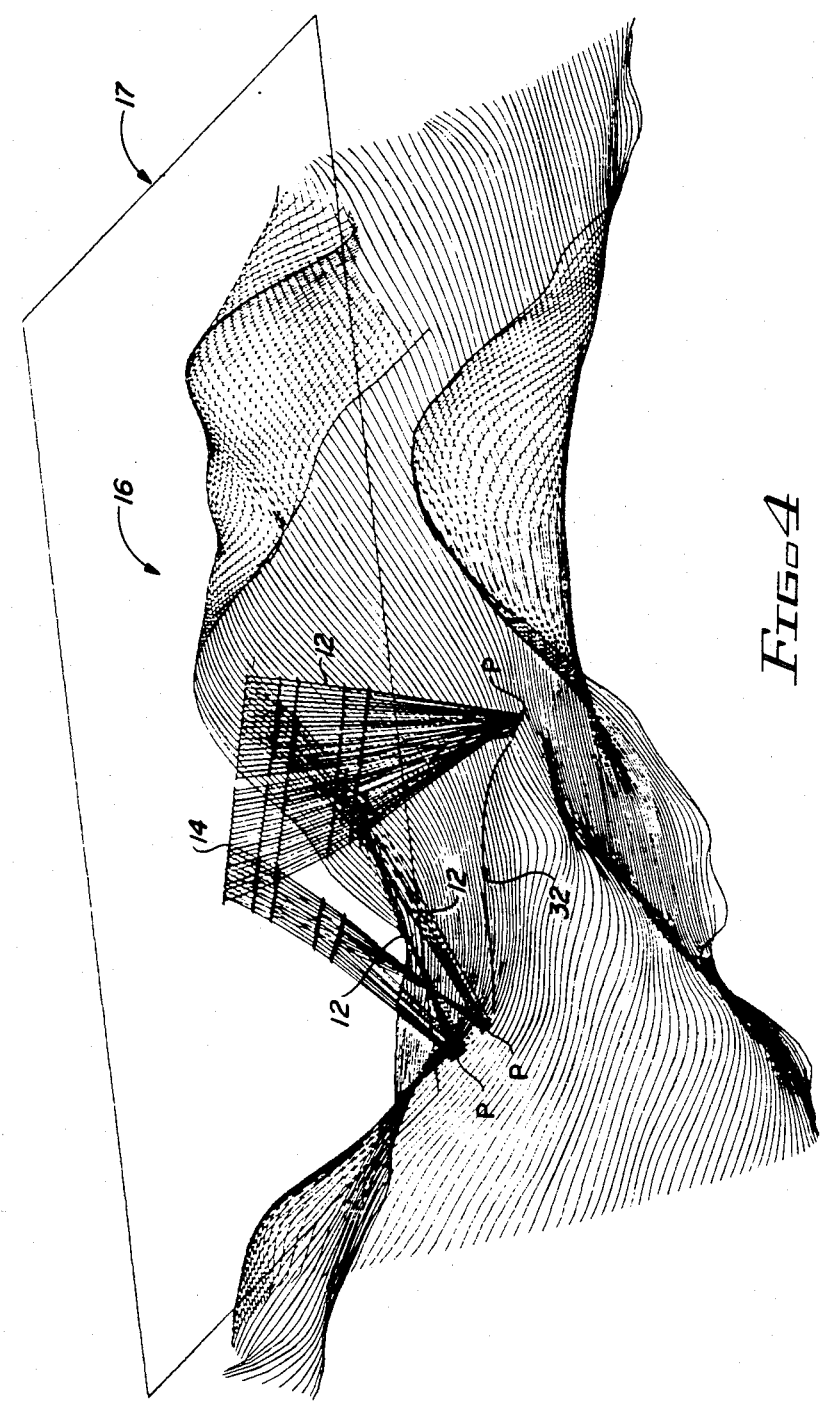
FIG. 4 is a representation of a salt dome model, showing the actual reflection points of energy used in producing a common midpoint gather along a seismic line.
Figure 5:
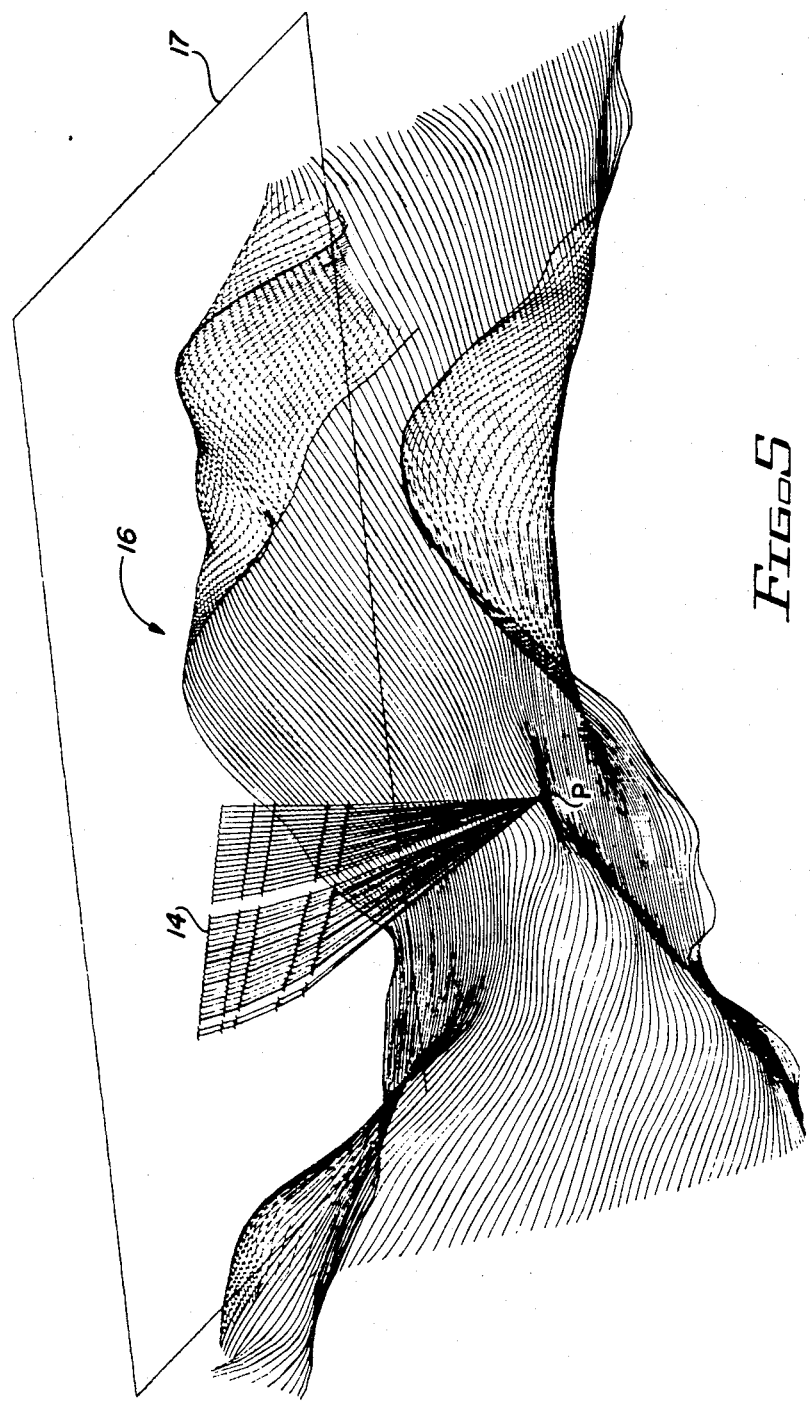
FIG. 5 is a representation of the salt dome model shown in FIG. 4, but showing the reflection point of energy used in producing a common reflection point gather.

The significance of utilizing CRP instead of CDP is illustrated more clearly by comparing FIGS. 4 and 5. In FIG. 4 it can be seen that a CDP constructed from data generated along seismic line 14 overlying a salt dome model 16 beneath the area 17 has been based on reflections 12 coming from reflection locations P spaced hundreds of meters apart and from out of the plane of the seismic line. In spite of this, the energy will have been stacked together in the same CDP in accordance with conventional procedures. In FIG. 5, however, which shows the same salt dome model as FIG. 4, the energy is reflected from a single common point P. A CRP stack will therefore accurately portray the data generated along seismic line 14. The model-based depth processing method of the present invention provides a practical way to generate CRP data in order to enhance structural information in areas of steep dip.

According to the invention CDP binning is not employed. Traces are binned instead according to the location of their reflection from the horizon being modeled. The reflection location is determined using the results of three-dimensional raytracing, and the model is considered correct when the synthetic seismic data from the model matches the seismic data in the binned domain. This matching is done with all available seismic lines covering the area of interest and, as previously pointed out, a separate sorting and stacking must be done for each major horizon in the model. The model is built from the top down because the effects of shallower horizons on deeper reflections can be very important. Since in some areas one seismic line can generate multiple reflection paths, each path needs to be compared to the seismic data independently, thus requiring a new sort and stack operation for each reflection path from every line.

Figure 6:
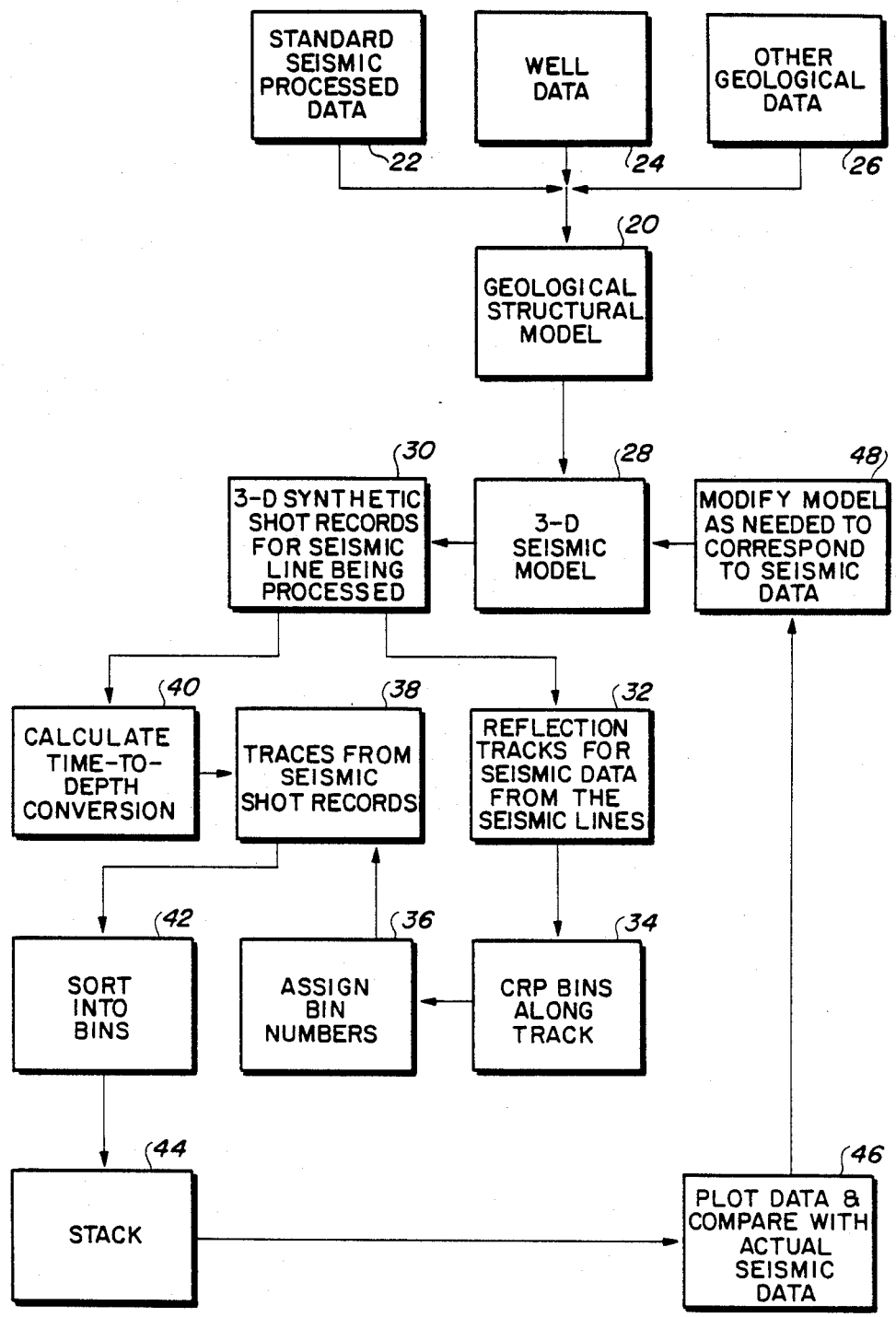
FIG. 6 is a flow chart of the method of the present invention as applied to a single horizon.

Referring to FIG. 6, which is a flow chart of the preferred steps involved in practicing the method of the invention, the first step of the invention is to estimate from available data a geological structural model 20 of the shallowest horizon of interest. The model would normally be produced from standard seismic processed data 22, well data 24 if available, and any other pertinent geological data 26 available. The geologic horizon of the structural model must correspond to the seismic horizon. This estimate is then entered into a three-dimensional seismic model 28, and three-dimensional shot records 30 are computed from the seismic model for the seismic lines being processed. One or more reflection tracks 32 are then estimated from the synthetic shot records. A reflection track 32 is shown in FIG. 4 to illustrate that this is the path along which reflection points P for the seismic line 14 are located. It can be seen to be a typically irregularly shaped path due to the compound slope of the horizon of interest.

It will be understood that the estimating of the geologic model, the creation of a three-dimensional seismic model and the incorporation of the geological data into the three-dimensional seismic model involve procedures well known by those skilled in the art. The computation of three-dimensional synthetic shot records and the estimating of reflection tracks to fit the seismic data for the seismic lines being processed, while not commonly known in industry, is, however, readily understood by geophysicists. Since these procedures are well known and since the invention is concerned not with such procedures themselves but with the overall method of depth processing seismic data utilizing the results of these steps, there is no need to go into a detailed explanation as to how these various functions are carried out.

The next step of the invention is to set up bins 34 along the reflection track 32 and to assign bin numbers 36 to each actual seismic trace from the seismic shot records 38. A standard static conversion 40 is calculated to convert the two-way travel time of the traces to depth, and both the bin number and static conversion figure are incorporated into the data of each trace.

The traces 38 are next sorted into common reflection point bins 42 and stacked as at 44 in accordance with conventional stacking procedures. The binned or sorted data and the stacked data are then inspected as at 46 and the difference between the seismic travel time and the model travel time is estimated, as is the error in internal velocity, such estimates being carried out by well known procedures. The three-dimensional seismic model is then changed as at 48 so as to match the actual seismic data, and the entire procedure is repeated as many times as necessary until the error in travel time and velocity is below the minimum required error, resulting in an accurate model for the horizon of interest.

Figure 7:
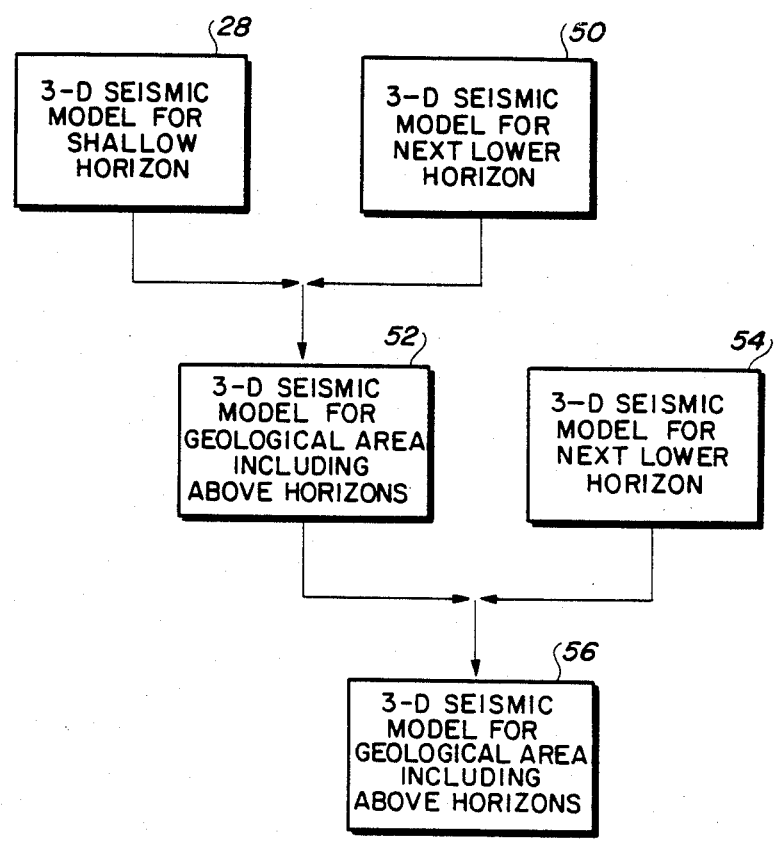
FIG. 7 is a flow chart of the method of the present invention using the results of the seismic model of FIG. 6 to construct a model of a larger area of geological interest.

Referring to FIG. 7, the process is begun again for the next lower major seismic event by creating a three-dimensional seismic model 50 in the same manner as described above, including input from the completed three-dimensional seismic model 28 of the next higher horizon. When the seismic model 50 is completed in the manner described above, the geological area which includes the horizons 28 and 50 can now be modeled as at 52. If there are other lower horizons of interest, such as that indicated at 54, they are sequentially modeled and included in the model of the geological area until the final seismic model 56 accurately portrays the entire geological area of interest.

Seismic data produced in accordance with the invention may look considerably different than data based on CDP stacks. For one thing the fold of the seismic data varies considerably along the seismic line, which is to be expected since the subsurface sampling along a two-dimensional seismic line can be very erratic. Another difference is that the data is now binned quite differently than by the common depth point or common midpoint method. The seismic data is now located according to its reflection track and does not correspond to the surface location of the seismic line. To locate the data it is necessary to have a map of the reflection path used to sort the line.

It will be understood that a CRP stack produced by the method of the invention is only strictly valid for the horizon being modeled and for some relatively small window in time around that layer. Other horizons that have a similar dip direction as the reflection path of the layer being modeled will be found on the stack in a partially migrated position. Although such horizons may not be binned exactly as they should, they will be binned more correctly than they would be according to the CDP data.

The CRP method of the invention now makes it possible to represent steep dips of about 45° to 80°, in contrast to the CDP method which is not capable of representing dips of greater than about 60°. In addition, the CRP method represents steep dips, even in the range of slopes normally represented by the CDP method, much more accurately. Whereas CDP is limited to two-dimensional data, requiring the seismic line to be oriented to the direction of the dip, the CRP method of the invention allows three-dimensional data to be utilized. Further, significant depth differences have been observed between CRP and CDP data in geologic areas of steep dip, with the representation produced by the present invention being the more accurate.

The invention not only enhances seismic data in areas where the geology includes steep or rapidly changing geometry, but permits the incorporation and understanding of three-dimensional effects using two-dimensional data, and is especially useful in prospect or reservoir delineation.

It should now be understood that the invention is not necessarily limited to the specific method steps described in connection with the preferred embodiment, but that changes to certain features of the preferred method which do not affect the overall basic function and concept of the invention may be made by those skilled in the art without departing from the spirit and scope of the invention, as defined in the appended claims.

What is claimed is:

1. A method of depth-processing seismic data to more accurately represent a dipping horizon, comprising the steps of:

obtaining seismic shot data for the horizon along a plurality of seismic lines and determining a seismic horizon therefrom;

estimating a geologic horizon corresponding to the seismic horizon;

entering the estimated geologic horizon into a three-dimensional seismic model of the horizon;

computing three-dimensional synthetic shot records for the seismic lines being processed;

estimating reflection tracks for the seismic lines from the computed shot records;

determining from the reflection tracks the common reflection points of the computed shot traces;

stacking the seismic shot traces according to their common reflection points;

comparing the seismic shot data with predicted shot data from the model, both before and after the stacking; and modifying the seismic model to bring it into substantial correspondence with the seismic data.

2. A method of depth-processing seismic data according to claim 1, including obtaining and modifying data in a similar manner for a plurality of horizons, the horizons of the seismic model being modified in sequence starting with the shallowest horizon and ending with the deepest horizon.

3. A method of depth-processing seismic data according to claim 1, wherein the step of comparing the seismic shot data with predicted shot data from the model comprises estimating the difference between the seismic travel time and the model travel time and estimating the error in interval velocity.

4. A method of depth-processing seismic data according to claim 1, including the step of calculating a two-way time-to-depth static conversion for the computed seismic shot traces and incorporating the bin numbers and the static conversion into the data of each seismic shot trace.

5. A method of depth-processing seismic data to more accurately represent a dipping horizon, comprising the steps of:

obtaining seismic shot data for the horizon along a seismic line and determining a seismic horizon therefrom;

estimating a geologic horizon corresponding to the seismic horizon;

entering the estimated geologic horizon into a three-dimensional seismic model of the horizon;

computing three-dimensional synthetic shot records for the seismic line being processed;

estimating the reflection track or tracks for the seismic line from the computed shot records;

setting up bins along the reflection track;

assigning a bin number to each seismic shot trace;

calculating a two-way time-to-depth static conversion for each computed trace;

incorporating the bin number and the static conversion into the data of each seismic shot trace;

sorting the seismic trace data into the bins;

stacking the seismic binned data;

comparing the seismic shot data with predicted shot data from the model; and modifying the seismic model to bring ti into substantial correspondence with the seismic data.

6. A method of depth-processing seismic data according to claim 5, wherein the method is repeated and the seismic model is modified in an iterative process until the margin of error between the actual seismic data and the model is within acceptable limits.

7. A method of depth-processing seismic data according to claim 6, wherein the method is repeated for the next lower horizon of interest until the model accurately portrays all geologic horizons of interest within an acceptable margin of error.

* * * * *

UNITED STATES PATENT AND TRADEMARK OFFICE
CERTIFICATE OF CORRECTION

PATENT NO. : 4,953,142

DATED : August 28, 1990

INVENTOR(S) : Daniel H. Rimmer

It is certified that error appears in the above-identified patent and that said Letters Patent is hereby corrected as shown below:

Col. 4, line 34: After "beneath the "insert --surface--
Col. 8, line 19: Delete "ti" and insert therefor --it--.

Signed and Sealed this

Fourth Day of February, 1992

Attest:

HARRY F. MANBECK, JR.

*Attesting Officer*      *Commissioner of Patents and Trademarks*